(12) United States Patent
Kinsho et al.

(10) Patent No.: US 11,805,074 B2
(45) Date of Patent: Oct. 31, 2023

(54) CONTROL APPARATUS, CONTROL METHOD AND PROGRAM

(71) Applicant: Nippon Telegraph and Telephone Corporation, Tokyo (JP)

(72) Inventors: Hideaki Kinsho, Musashino (JP); Takuto Kimura, Musashino (JP); Taichi Kawano, Musashino (JP); Kazuhisa Yamagishi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/800,078

(22) PCT Filed: Aug. 27, 2020

(86) PCT No.: PCT/JP2020/032427
§ 371 (c)(1),
(2) Date: Aug. 16, 2022

(87) PCT Pub. No.: WO2021/166288
PCT Pub. Date: Aug. 26, 2021

(65) Prior Publication Data
US 2023/0103218 A1    Mar. 30, 2023

(51) Int. Cl.
*H04L 47/80* (2022.01)
*H04L 67/141* (2022.01)

(52) U.S. Cl.
CPC ......... *H04L 47/803* (2013.01); *H04L 47/805* (2013.01); *H04L 67/141* (2013.01)

(58) Field of Classification Search
CPC .... H04L 47/803; H04L 47/805; H04L 67/141
(Continued)

(56) References Cited

U.S. PATENT DOCUMENTS 11,419,010 B2 * 8/2022 Zhu .................... H04B 7/15542
2002/0012359 A1 * 1/2002 Kikuchi ............... H04W 28/18
370/468

(Continued)

FOREIGN PATENT DOCUMENTS

| CN | 103632209 B | * | 5/2016 |
| JP | 2011155600 | | 8/2011 |
| KR | 20120086181 A | * | 8/2012 |

OTHER PUBLICATIONS

Machine translation of KR 20120086181 (Year: 2018).*
(Continued)

*Primary Examiner* — Ruolei Zong
(74) *Attorney, Agent, or Firm* — Fish & Richardson P.C.

(57) ABSTRACT

A control apparatus includes an acquisition unit that acquires application information related to at least one of a plurality of sessions at a plurality of timings for each of the plurality of sessions related to a plurality of types of applications that are communicating in a network, a search unit that searches for an allocation band of each of the plurality of sessions at the plurality of timings based on a QoE prediction value of each of the plurality of sessions derived from the application information and a condition for a band of the network, and a control unit that controls allocation of a band for each of the plurality of sessions at the plurality of timings based on the allocation band searched by the search unit.

8 Claims, 10 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 2011/0185052 A1* | 7/2011 | Nakahira | .............. | H04L 41/083 |
| | | | | 709/223 |
| 2012/0236713 A1* | 9/2012 | Kakadia | .............. | H04L 41/5025 |
| | | | | 370/236 |
| 2015/0281980 A1* | 10/2015 | Zhou | ................. | H04W 28/0268 |
| | | | | 370/254 |
| 2019/0045399 A1* | 2/2019 | Bongaarts | ............... | H04W 4/00 |

OTHER PUBLICATIONS

Machine translation of CN 103632209 (Year: 2016).*
Hirotada Honda et al., "Playback State Estimation of Progressive Download-based Video Services", 2013, NTT Technical Review, https://www.ntt-review.jp/archive/ntttechnical.php?contents=ntr201305fa3.pdf&mode=show_pdf (Year: 2013).*
Arpaci-Dusseau et al., "Operating Systems: Three Easy Pieces," Arpaci-Dusseau Books, Sep. 1, 2018, 13 pages.
Hori et al., "QoE and Throughput Aware Radio Resource Allocation Algorithm in LTE Network with Users using Different Applications," 27th Annual Internationa 1Symposium on Personal, Indoor, Mobile Radio Communications (PIMRC), Sep. 4, 2016, 6 pages.
Kinsho et al., "A Study on Bandwidth Control Based on Application Quality of Experience," Proceedings of the 2020 General Conference of the Society of Electronic Information and Communication, 3 pages (with English Translation).

\* cited by examiner

| SESSION INFORMATION | | | | APPLICATION INFORMATION | | | | |
|---|---|---|---|---|---|---|---|---|
| DESTINATION IP ADDRESS | DESTINATION PORT NUMBER | SOURCE IP ADDRESS | SOURCE PORT NUMBER | L4 PROTOCOL | APPLICATION TYPE | BUFFER LENGTH [s] | PLAYBACK STOP INFORMATION | BIT RATE SERIES [kbps] | COMMUNICATION TIME [s] |
| 1.1.1.1 | 443 | 1.1.2.1 | 49255 | TCP | Web | – | – | – | 2 |
| 1.1.1.2 | 443 | 1.1.2.2 | 49256 | UDP | MOVING IMAGE | 5 | [(0,2)] | [300,500, 200] | – |
| 1.1.1.2 | 443 | 1.1.2.3 | 49257 | UDP | MOVING IMAGE | 3 | [(0,3), (6,7), (10,13)] | [700,1000] | – |

CONTROL APPARATUS, CONTROL METHOD AND PROGRAM

CROSS-REFERENCE TO RELATED APPLICATIONS

This application is a National Stage application under 35 U.S.C. § 371 of International Application No. PCT/JP2020/032427, having an International Filing Date of Aug. 27, 2020, which claims priority to International Application No. PCT/JP2020/007227, filed on Feb. 21, 2020, the disclosures of both of which are considered part of the disclosure of this application, and are incorporated by reference in their entirety into this application.

TECHNICAL FIELD

The present disclosure relates to a control apparatus, a control method, and a program.

BACKGROUND ART

Due to the influence of an improvement in video distribution service quality, an increase in web sessions, and the like, the amount of traffic flowing through a network is rapidly increasing. In a current network, many users share a finite band. Thus, such an increase in traffic volume causes a degradation in network quality of service (QoS), such as a decrease in throughput and an increase in a packet loss rate. Further, such a degradation in QoS may result in a degradation in user quality of experience (QoE).

In addition, in the current network, a bottleneck device and the interface of the device are often specified in one place. In each interface, quality is controlled by allocating a band to each session. Thus, it is important to determine an appropriate allocation band for each session and perform band allocation based on the determined allocation band.

In order for many users to comfortably use services via the network, it is important to consider the QoE, such as reducing the number of users (the number of sessions) with low QoE or increasing the average value of the QoE for all users (sessions). As a known band control scheme, there is round robin (NPL 1). This control scheme is also used in real networks and performs control to fairly allocate a band in terms of QoS. As the known band control scheme for controlling an allocation band based on the QoE, there is NPL 2.

CITATION LIST

Non Patent Literature

NPL 1: Remzi H. Arpaci-Dusseeau and Andrea C. Arpaci-Dusseau, "Operating Systems: Three Easy Pieces", Arpaci-Dusseau Books, 2018.
NPL 2: T. Hori and T. Ohtsuki, "QoE and Throughput Aware Radio Resource Allocation Algorithm in LTE Network with Users using Different Applications", in Proc 27th Annual International Symposium on Personal, Indoor, Mobile Radio Communications (PIMRC), pp. 1-6, September 2016.

SUMMARY OF THE INVENTION

Technical Problem

In order to perform control in terms of QoE, it is preferred to perform a band control based on a quantitative QoE index, such as a mean opinion score (MOS). In addition, because the number of users who use the network changes from moment to moment, it is preferred to sufficiently utilize the band by dynamically changing the allocation band even in response to such a change in the network.

Figure 1:
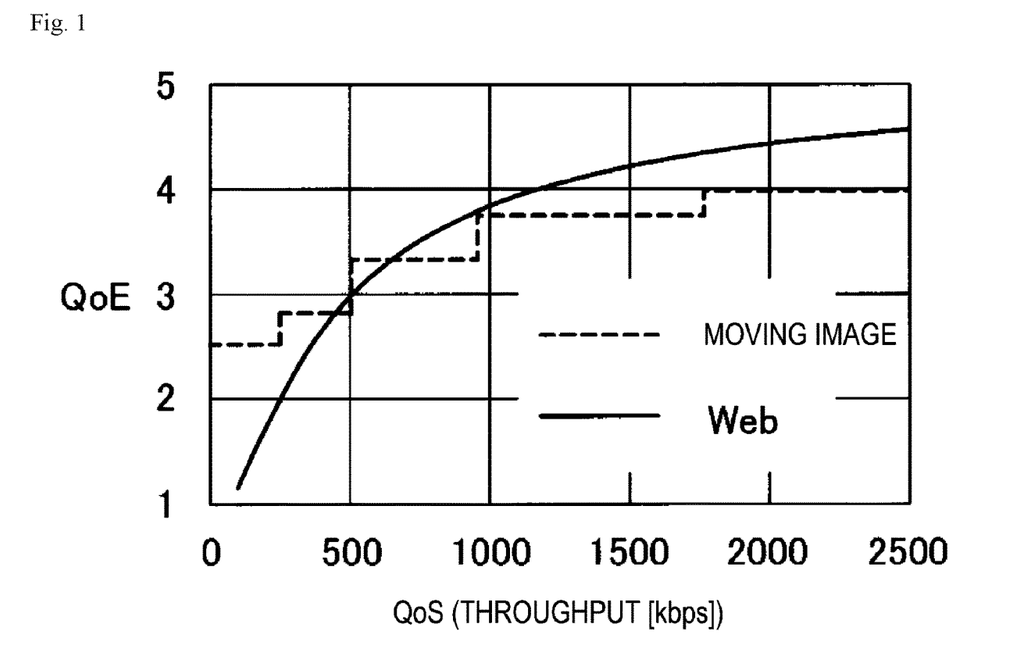
FIG. 1 is a diagram illustrating an example of a relationship between QoS and QoE, which differs application by application.

FIG. 1 is a diagram illustrating an example of a relationship between QoS and QoE, which differs application by application. In FIG. 1, the relationship between the QoS (throughput) and the QoE for each application when the throughput is used as the QoS and a moving image and the Web are targeted as the applications is illustrated by a graph.

As illustrated in FIG. 1, the relationship between QoS (throughput) and QoE varies depending on the application, and thus, the QoE varies depending on the application even if the QoS is the same. Thus, it is preferred to appropriately set the allocation band for each of a plurality of applications.

Unfortunately, none of the known band control schemes satisfy all these conditions. For example, in the band control scheme of NPL 1, it is possible to sufficiently utilize the band even in response to the change in network, by dynamically changing the allocation band so that the QoS becomes fair, but the bandwidth control scheme is not based on the quantitative QoE, and it is not possible to set the allocation band for each application.

In addition, in a band control scheme using a 5-tuple (destination IP address, destination port number, source IP address, source port number, L4 protocol) that may be used in a real network, an allocation band is set for each application by identifying the application for each user (session) from the 5-tuple, and thus the band can also be sufficiently utilized even in response to a network change, but the band control scheme is not based on the quantitative QoE index.

Further, in the band control scheme in NPL 2, the allocation band can be set for each application based on the quantitative QoE index, but it is not possible to dynamically change the allocation band. Thus, it is not possible to sufficiently utilize the band in response to a change in the network.

Even when these three known schemes are combined, the allocation band can be set for each application based on the quantitative QoE index, but it is not possible to dynamically change the allocation band, and it is not possible to sufficiently utilize the band in response to the change in the network. Thus, it is not possible to satisfy all the above conditions. This is because the combination of the known schemes does not hold the application state and is not possible to appropriately calculate the QoE for the user (session) in the middle of communication.

The present disclosure has been made in view of the above points, and an object thereof is to be capable of reducing sessions with low QoE when a plurality of types of applications are set as control targets in a network environment that changes with time.

Means for Solving the Problem

In order to solve the above problem, a control apparatus includes an acquisition unit that acquires application information related to at least one of a plurality of sessions at a plurality of timings for each of the plurality of sessions related to a plurality of types of applications that are communicating in a network, a search unit that searches for an allocation band of each of the plurality of sessions at the plurality of timings based on a QoE prediction value of each of the plurality of sessions derived from the application information and a condition for a band of the network, and a control unit that controls allocation of a band for each of the plurality of sessions at the plurality of timings based on the allocation band searched by the search unit.

Effects of the Invention

It is possible to reduce the number of sessions having low QoE when a plurality of types of applications are set as control targets in a network environment that changes with time.

DESCRIPTION OF EMBODIMENTS

Figure 2:
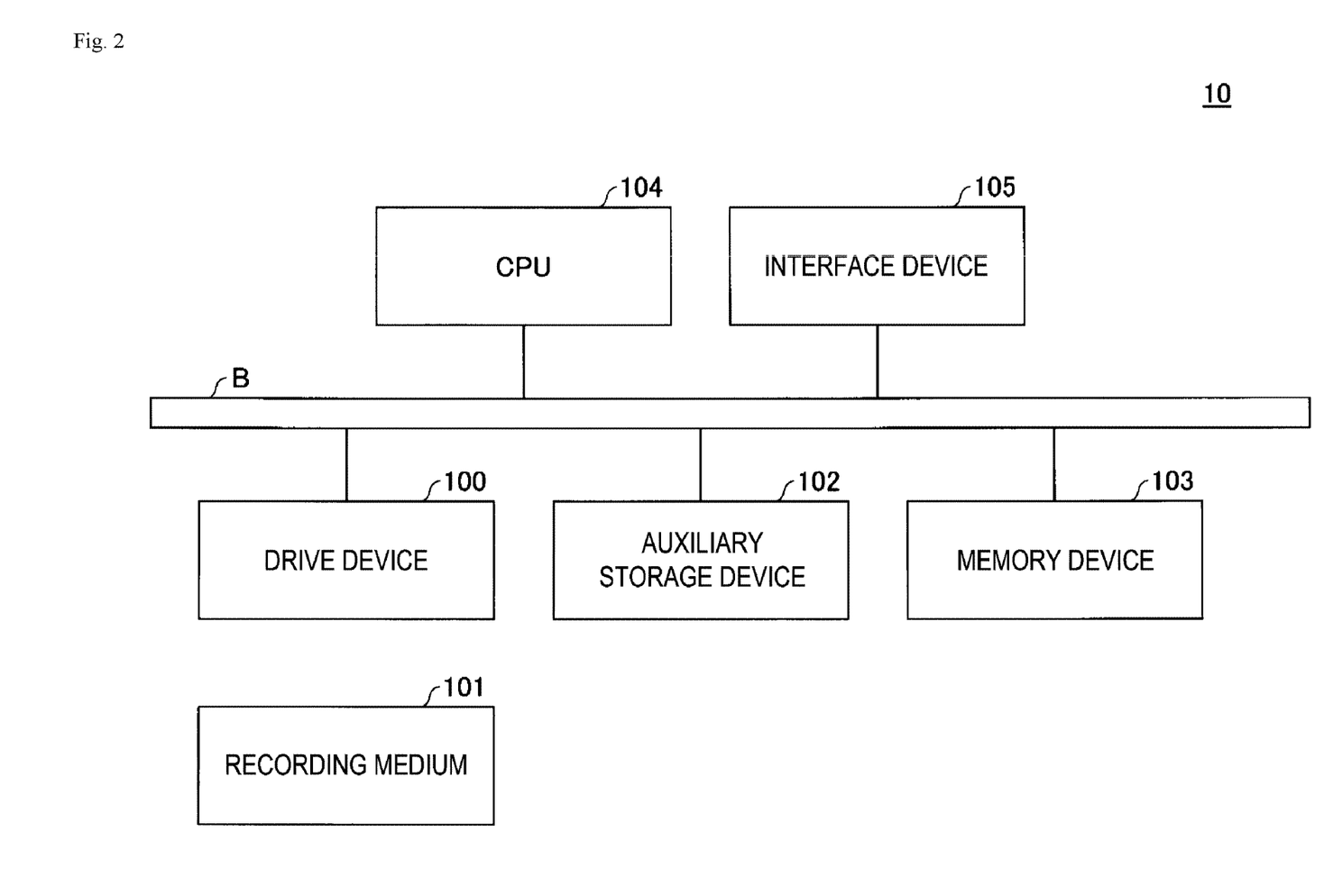
FIG. 2 is a diagram illustrating an example of a hardware configuration of a control apparatus 10 according to a first embodiment.

Hereinafter, embodiments of the present disclosure will be described with reference to the drawings. FIG. 2 is a diagram illustrating an example of a hardware configuration of a control apparatus 10 according to a first embodiment. The control apparatus 10 of FIG. 2 includes a drive device 100, an auxiliary storage device 102, a memory device 103, a CPU 104, and an interface device 105 that are connected to each other via a bus B.

A program for implementing processing in the control apparatus 10 is provided by a recording medium 101 such as a CD-ROM. When the recording medium 101 storing the program is set in the drive device 100, the program is installed on the auxiliary storage device 102 from the recording medium 101 via the drive device 100. However, the program does not necessarily have to be installed from the recording medium 101 and may be downloaded from another computer via a network. The auxiliary storage device 102 stores the installed program and also stores files, data, and the like.

The memory device 103 reads and stores the program from the auxiliary storage device 102 when the program is instructed to start. The CPU 104 performs functions related to the control apparatus 10 in accordance with the program stored in the memory device 103. The interface device 105 is used as an interface for connection to a network.

Figure 3:
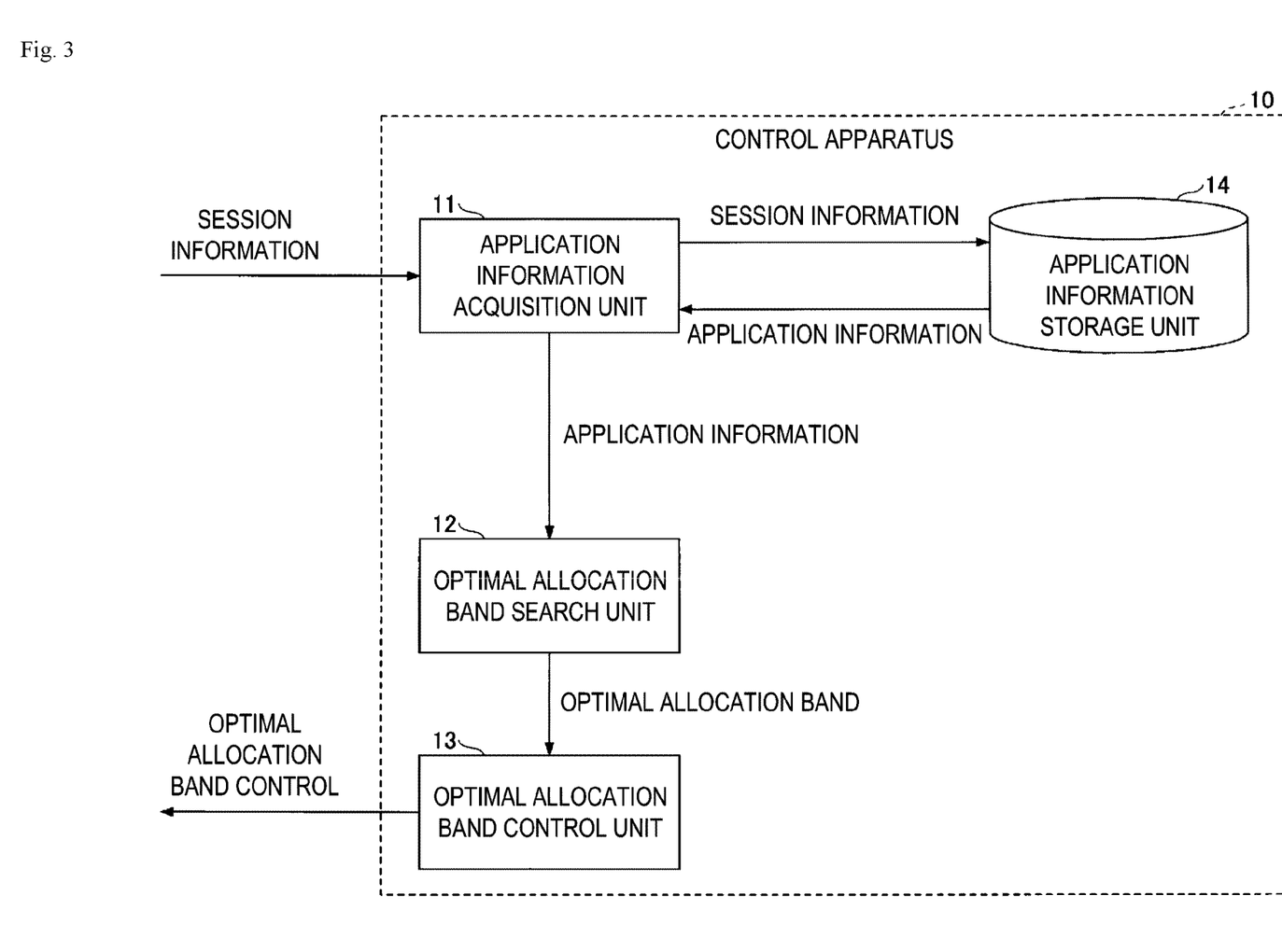
FIG. 3 is a diagram illustrating an example of a functional configuration of the control apparatus 10 according to the first embodiment.

FIG. 3 is a diagram illustrating an example of a functional configuration of the control apparatus 10 according to the first embodiment. The control apparatus 10 searches for and controls an optimal allocation band for each session, by using information of each session used for communication as an input. The session information is identification information of a session represented by a 5-tuple. The 5-tuple refers to a set represented by a destination IP address, a destination port number, a source IP address, a source port number, and an L4 protocol.

In FIG. 3, the control apparatus 10 includes an application information acquisition unit 11, an optimal allocation band search unit 12, an optimal allocation band control unit 13, and the like. Each of these units is implemented by processing that the CPU 104 is caused to execute by one or more programs installed on the control apparatus 10. Furthermore, the control apparatus 10 uses an application information storage unit 14. The application information storage unit 14 can be implemented by using, for example, an auxiliary storage device 102, or a storage device connectable to the control apparatus 10 via a network.

Figure 4:
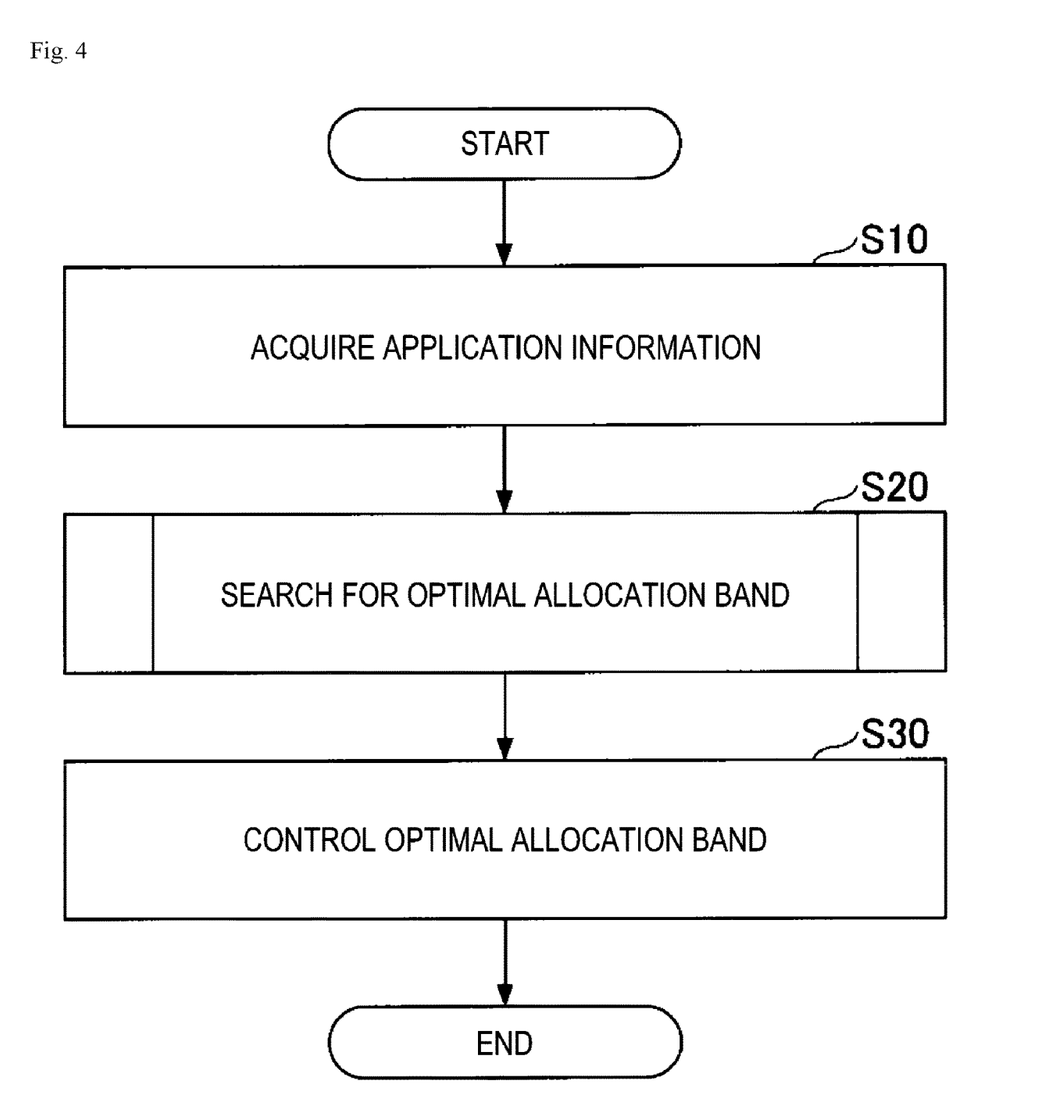
FIG. 4 is a flowchart for explaining an example of a processing procedure executed by the control apparatus 10 according to the first embodiment.

A processing procedure executed by the control apparatus 10 will be described below. FIG. 4 is a flowchart for explaining an example of a processing procedure executed by the control apparatus 10 in the first embodiment. The processing procedure of FIG. 4 is repeatedly executed at a plurality of timings (for example, periodically (for example, a cycle of 2 seconds)).

In Step S10, the application information acquisition unit 11 acquires, from the application information storage unit 14, application information corresponding to each session (each session is referred to as a "target session" below) related to the input one or more pieces of session information. Session information of each session currently in communication is input to the application information acquisition unit 11. For example, such session information may be acquired by acquiring header information of a packet flowing through a network.

Figure 5:
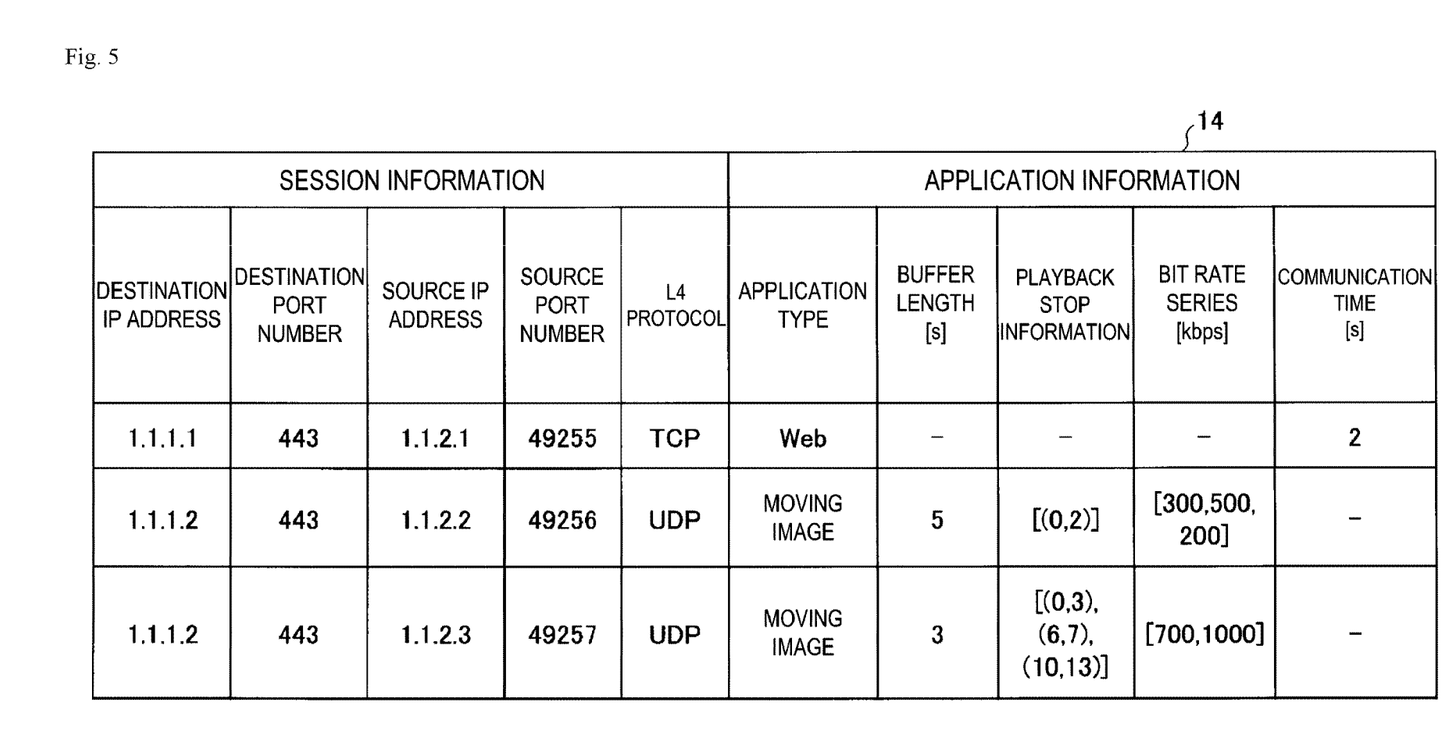
FIG. 5 is a diagram illustrating an example of a configuration of an application information storage unit 14.

FIG. 5 is a diagram illustrating an example of a configuration of the application information storage unit 14. As illustrated in FIG. 5, the application information storage unit 14 stores application information in association with the session information of each session currently in communication. Here, it is assumed that the application information is updated from moment to moment during communication. Thus, the information stored in the application information storage unit 14 may be input by a user or the like, or may be automatically input by an external device such as a device that monitors the network. Alternatively, the application information acquisition unit 11 may update the application information storage unit 14 by acquiring packet information flowing through the network and estimating the application information from the packet information.

As illustrated in FIG. 5, the application information includes parameters such as an application type, a buffer length, playback stop information, a bit rate series, and a communication time. In the example of FIG. 5, an example in which there are one session of the Web (a session having an application type of "the Web") and two sessions of a moving image (sessions having an application type of "moving image") is illustrated.

Among the parameters constituting the application information, the application information of the session of the Web (referred to as a "web session" below) is configured by an application type and a communication time. The application type is a type of application corresponding to the session. In the present embodiment, the type of application is classified into "the Web" or "moving image". The communication time represents an elapsed time from the start of a session to almost the current time.

The application information of the session of the moving image (referred to as a "moving image session" below) of the moving image includes an application type, a buffer length, playback stop information, and a bit rate series. The buffer length is the time length of moving image data that is currently buffered and further not played in a client of a moving image session (for example, a viewing terminal such as a personal computer (PC), a smartphone, or a tablet terminal). Here, buffering means that moving image data received by a terminal is accumulated in a memory of the terminal before being played. The playback stop information is an array of a set of an occurrence time and an end time of a playback stop. For example, [(0, 2)] represents that the playback stop has occurred once and the playback has been stopped until 2 seconds after the start of communication. The bit rate series is an array of the average bit rate for each any media time. For example, [700, 1000] represents that, in a media time, the average bit rate from 0 seconds to 10 seconds is 700 kbps, and the average bit rate from 10 seconds to 20 seconds is 1000 kbps. These are examples, and parameters held may vary in accordance with variables used during prediction of the QoE. Examples of variables used during prediction of the QoE include a frame rate, a resolution, and the like in addition to those described above.

Subsequently, the optimal allocation band search unit 12 searches for an allocation band (optimal allocation band) for each target session such that the minimum QoE prediction value increases among the QoE prediction values for the corresponding target sessions (S20).

The QoE prediction value refers to an estimated value of QoE obtained at a slightly following time point after a certain band is allocated to each session. The slightly following time point is, for example, in a moving image, a time point at which reception of the chunk of one chunk ahead is completed without including the chunk being received at the time of band allocation, and, in the Web, a time point at which reception of the estimated data amount (such as 500 KB) included in the content is completed. In a moving image, the estimated value of the QoE at a time point at which reception of the chunk of h-chunk ahead is completed without including the chunk being received at the time of band allocation may be used as a QoE prediction value. In the Web, the estimated value of the QoE at the time point when a preset time has elapsed from the start of communication of each session may be used as a QoE prediction value.

Subsequently, the optimal allocation band control unit 13 controls the allocation band for each session based on the optimal allocation band searched by the optimal allocation band search unit 12 (S30). For example, when the control is performed in a router, the optimal allocation band control unit 13 controls the amount of data that can be transmitted per unit time by each session, by weighting based on the optimal allocation band. For example, when there are three sessions in a band with entire band of 10 Mbps and allocation is performed as (2 Mbps, 2 Mbps, 6 Mbps), weighting based on the optimal allocation band can be performed by setting (0.2, 0.2, 0.6) as a weight for each session.

Figure 6:
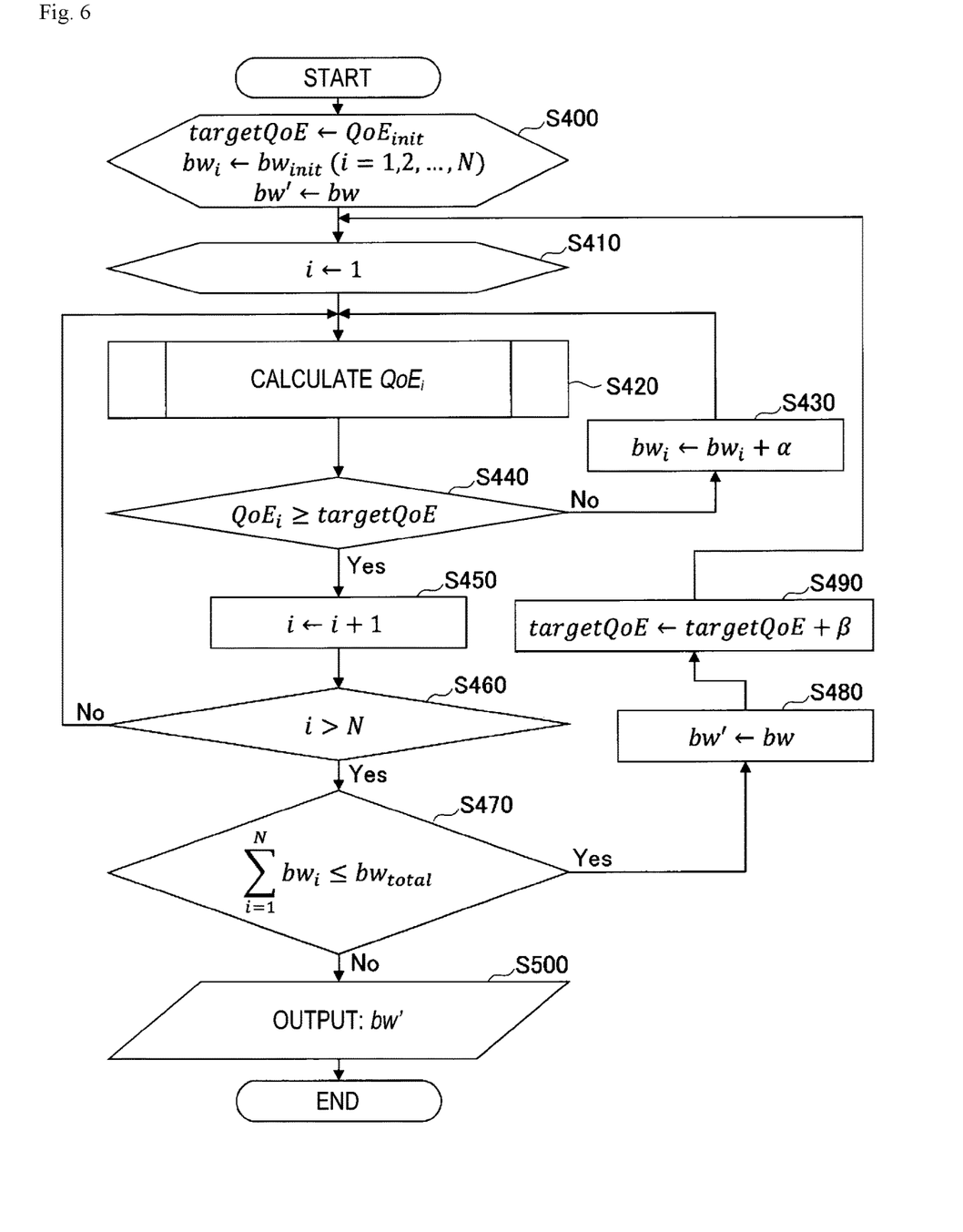
FIG. 6 is a flowchart for explaining an example of a processing procedure of search processing of an optimal allocation band according to the first embodiment.

Subsequently, details of Step S20 will be described. FIG. 6 is a flowchart for explaining an example of a processing procedure of search processing of the optimal allocation band according to the first embodiment.

In Step S400, the optimal allocation band search unit 12 sets initial values in the respective variables of targetQoE, bw, and bw'. Here, targetQoE $\in$ [1, 5] represents a QoE prediction value that is to be satisfied at the minimum by all sessions i (i=1, 2, ..., N) that are targets. bw=$\{bw_i\} \in R^N$ represents an allocation band candidate vector (R is a set of real numbers (the same is applied to the following)). bw'=$\{bw_i'\} \in R^N$ represents an optimal allocation and is represented by an N-dimensional vector of the allocation band.

Specifically, the optimal allocation band search unit 12 sets $QoE_{init}$ as an initial value for targetQoE. The optimal allocation band search unit 12 sets $bw_{init}$ as an initial value for each element $bw_i$ (i=1, 2, ..., N) in bw=$\{bw_i\} \in R^N$. The optimal allocation band search unit 12 sets (substitutes) bw to bw' as the initial value. $QoE_{init}$ may be set to 1, for example, and $bw_{init}$ may be set to 100 kbps, for example.

In the subsequent Steps S410 to S490, the optimal allocation band search unit 12 searches for the allocation band that satisfies the quality condition for each target session until the band condition (threshold value) is not satisfied. The quality condition represents a condition (threshold value) to be satisfied by the QoE prediction value of each target session and, in the present embodiment, represents that the QoE prediction value of each target session is equal to or greater than targetQoE. The band condition is that the sum $\Sigma_{i=1}^{N} bw_i$ of each element $bw_i$ of the allocation band candidate vector bw is equal to or smaller than an available band $bw_{total}$.

In Step S410, the optimal allocation band search unit 12 plugs in 1 for the variable i. The variable i is a variable for identifying each target session. The i-th target session is referred to as the "session i" below.

In Step S420, the optimal allocation band search unit 12 calculates $QoE_i$ (i=1, 2, ..., N), which is the QoE prediction value of the session i, based on the application information of the session i and $bw_i$. $QoE_i$ represents the QoE at a time point which is slightly following when $bw_i$ is allocated to the session i. The prediction of $QoE_i$ splits into two steps: calculating a prediction value of application information from $bw_i$, and calculating $QoE_i$ from the application information.

Each step differs depending on whether the session is a moving image or the Web, and thus the description will be first made for the moving image. When the application type corresponding to the session i is a moving image, the optimal allocation band search unit 12 calculates respective prediction values of playback stop information and the bit rate series in the case where $bw_i$ is allocated to the session i. The playback stop information and the bit rate series are estimated by using a chunk length and a bit rate selection algorithm.

Thus, first, the chunk length and the bit rate selection algorithm will be described. The chunk length means a length of a moving image of one block when one moving image content is divided into a plurality of blocks. This one block is referred to as a chunk. For example, when a 60-second moving image is divided into 30 chunks, the chunk length is 2 seconds. Because the chunk length is different for each setting of a moving image distribution service provider, the chunk length may be measured by a terminal when the moving image of each moving image distribution service provider is downloaded, or the chunk length widely used may be used as the representative value. Each chunk is also re-encoded at a plurality of bit rates and stored in a distribution server. A moving image player selects a bit rate suitable for the current network status and buffer status by using the bit rate selection algorithm and requests a chunk encoded at the selected bit rate. The moving image player plays back at any time while receiving the chunk. An example of the bit rate selection algorithm is an algorithm of selecting the maximum bit rate that does not exceed the average throughput when the most recent chunk is received. Similarly to the chunk length, the bit rate selection algorithm may be estimated by measuring the behavior of the algorithm when the moving image of the moving image distributor is downloaded or may be assumed that a specific algorithm is used.

The estimated values of the playback stop information and the bit rate series are calculated using these. First, the bit rate series may be estimated in accordance with the bit rate selection algorithm. For example, assuming that the current bit rate series is [700, 1000] and the bit rate selected in accordance with the selection algorithm is 500 kbps, the bit rate series is calculated as [700, 1000, 500]. The playback stop information may be estimated by estimating the transition of buffer length. For example, when the buffer length is 0 from 2 seconds to 4 seconds in real time, it can be determined that the playback stop occurred once and the playback stop time is 2 seconds. The transition of the buffer length can be estimated using the bit rate selection algorithm, the chunk length, and $bw_i$. In one example, a case where the chunk length is 2 seconds, the current buffer length is 1 second, $bw_i$ is 250 kbps, the current playback stop information is [(0, 2)], the current time is 4, and the bit rate of the chunk requested next is 500 kbps is considered. Here, 500 kbps is assumed to be determined in accordance with the bit rate selection algorithm. Because data of 500 kbps×2 seconds=1000 kbits is received in order to receive the requested chunk, it takes 4 seconds to receive the data when the data is received in a band of 250 kbps. Since the current buffer length is 1 second, it can be calculated that the buffer length becomes 0 after 1 second, reception of the chunk is completed after the playback stop state has elapsed 3 seconds, and the buffer length is 2 seconds. At this time, the playback stop information may be estimated as [(0, 2), (5, 8)].

When the application type corresponding to the session i is the Web, the optimal allocation band search unit 12 calculates the estimated value of the communication time at a slightly following time point when $bw_i$ is allocated to the session i. The communication time is estimated using the web content size. For example, when the web content size is 500 kB and $bw_i$ is 1000 kbps, the communication time can be calculated as 500×8/1000=4 seconds. Here, in order to convert the unit of byte and bit, the web content size is multiplied by 8. The web content size may be acquired by actually downloading the content sizes of representative websites in advance and using an average value thereof. Then, the optimal allocation band search unit 12 calculates $QoE_i$ by inputting the estimated application information into a known QoE estimation model. For example, when the application type corresponding to the session i is a moving image, $QoE_i$ may be calculated by inputting the estimated value of each of the playback stop information and the bit rate series into a known QoE estimation model (See, for example, "K. Yamagishi, and T. Hayashi, "Parametric Quality-Estimation Model for Adaptive-Bitrate-Streaming Services", IEEE Transactions on Multimedia, vol. 19, no. 7, pp. 1545-1557, July 2017"). When the application type corresponding to the session i is the Web, $QoE_i$ may be calculated by inputting the estimated value of the communication time into a known QoE estimation model (See, for example, "T. Tominaga, et al., "Web-Browsing QoE Estimation Model", IEICE Transactions on Communications, vol. E100-B, no. 10, pp. 1837-1845, October 2017").

For each of the estimated values of the playback stop information and the bit rate series at a slightly following time point when $bw_i$ is allocated to the session i, for example, the values obtained by the experiment for a certain session and for each allocation band may be stored in advance in the auxiliary storage device 102 or the like, and the values may be used as the estimated values. In addition, also for the estimated value of the communication time at a slightly following time point when $bw_i$ is allocated to the session i, for example, the values obtained by the experiment for a certain session and for each allocation band may be stored in advance in the auxiliary storage device 102 or the like, and the values may be used as the estimated values.

Subsequently, the optimal allocation band search unit 12 determines whether $QoE_i$ is equal to or greater than targetQoE (S430). That is, it is determined whether the $QoE_i$ satisfies the quality condition.

When $QoE_i$ is smaller than targetQoE (No in S440), the optimal allocation band search unit 12 increases $bw_i$ by $\alpha$ and returns to Step S420. Thus, $QoE_i$ is repeatedly calculated until $QoE_i$ is equal to or greater than targetQoE. $\alpha$ is a parameter set in advance. When $QoE_i \geq$ targetQoE holds, the optimal allocation band search unit 12 sets the allocation band of the session i as $bw_i$ at that time and proceeds to Step S450 and the subsequent steps.

When $QoE_i$ is equal to or greater than targetQoE (Yes in S440), the optimal allocation band search unit 12 adds 1 to the variable i (S450) and compares the value of the variable i with N (total number of target sessions) (S460). When the value of the variable i is equal to or smaller than N (No in S450), the optimal allocation band search unit 12 performs Step S420 and the subsequent steps for the session i. When the value of the variable i is greater than N (Yes in S460), the optimal allocation band search unit 12 proceeds to Step S470. Thus, at the time point of proceeding to Step S470, pieces of $bw_i$ that satisfy the quality condition for all target sessions are specified.

In Step S470, the optimal allocation band search unit 12 determines whether bw satisfies the band condition. That is, it is determined whether the sum $\Sigma_{i=1}^{N} bw_i$ of each element $bw_i$ of the allocation band candidate vector bw is equal to or smaller than an available band $bw_{total}$.

When bw satisfies the band condition (Yes in S470), the optimal allocation band search unit 12 updates bw' to bw (S480), increases targetQoE by $\beta$ (S490), and repeats Step S410 and the subsequent steps. When bw does not satisfy the band condition (No in S470), the optimal allocation band search unit 12 outputs bw' as the optimal allocation band to the optimal allocation band control unit 13 (S500).

A processing procedure of search processing of the optimal allocation band will be described below based on a specific example. In this specific example, it is assumed that $QoE_{init}=1.0$, $bw_{init}=250$, $\alpha=250$, $\beta=1.0$, $bw_{total}=1500$, and N=3, and it is assumed that the session 1 is a web session, the session 2 is a moving image session having a buffer length of 5 seconds, and the session 3 is a moving image session having a buffer length of 3 seconds.

In Step S400, the initial value of each variable is set as follows.

$$\text{targetQoE}=1.0, bw'=bw=(250,250,250)^T$$

In Step S410 and the subsequent steps (first time), for each session, for example, the allocation band $bw_i$ satisfying the quality condition is searched as follows.

$QoE_1=1.0 \geq targetQoE=1.0$ when $bw_1=250$ $QoE_2=3.5 \geq targetQoE=1.0$ when $bw_2=250$ $QoE_3=2.5 \geq targetQoE=1.0$ when $bw_3=250$ In this case, because all pieces of $bw_i$ satisfy the quality condition in the state of the initial value, the optimal allocation band search unit 12 proceeds to Step S470 without updating $bw_i$ by α.

In Step S470 (first time), whether the band condition is satisfied for all the target sessions is determined to be as follows.

$bw_1+bw_2+bw_3=250+250+250=750 \leq bw_{total}=1500$

In this case, because the band condition is satisfied, the optimal allocation band search unit 12 updates each of targetQoE and bw' as follows and returns to Step S410.

$targetQoE=targetQoE+\beta=1.0+1.0=2.0$ $bw'=bw=(250,250,250)^T$

In Step S410 and the subsequent steps (second time), when $bw_1=250$ holds, $QoE_1=1.0<targetQoE=2.0$ holds, and thus $bw_1$ is updated as follows.

$bw_1=bw_1+\alpha=250+250=500$

Then, for example, for each session, the allocation band $bw_i$ that satisfies the quality condition is searched as follows.

$QoE_1=2.0 \geq targetQoE=2.0$ when $bw_1=500$ $QoE_2=3.5 \geq targetQoE=2.0$ when $bw_2=250$ $QoE_3=2.5 \geq targetQoE=2.0$ when $bw_3=250$ Because all pieces of $bw_i$ satisfy the quality condition in this state, the optimal allocation band search unit 12 proceeds to Step S470.

In Step S470 (second time), whether the band condition is satisfied for all the target sessions is determined to be as follows.

$bw_1+bw_2+bw_3=500+250+250=1000 \leq bw_{total}=1500$

In this case, because the band condition is satisfied, the optimal allocation band search unit 12 updates each of targetQoE and bw' as follows and returns to Step S410.

$targetQoE=targetQoE+\beta=2.0+1.0=3.0$ $bw'=bw=(500,250,250)^T$

In Step S410 and the subsequent steps (third time), when $bw_1=500$ holds, $QoE_1=2.0<targetQoE=3.0$ holds, and thus $bw_1$ is updated as follows.

$bw_1=bw_1+\alpha=500+250=750$

Then, for each session, for example, the allocation bands $bw_1$ and $bw_2$ satisfying the quality conditions are searched as follows.

$QoE_1=3.0 \geq targetQoE=3.0$ when $bw_1=750$ $QoE_2=3.5 \geq targetQoE=3.0$ when $bw_2=250$ When $bw_3=250$ holds, $QoE_3=2.5<targetQoE=3.0$ holds, and thus $bw_3$ is updated as follows.

$bw_3=bw_3+\alpha=250+250=500$

As a result, the allocation band $bw_3$ that satisfies the quality conditions is searched as follows.

$QoE_3=3.0 \geq targetQoE=3.0$ when $bw_3=500$

Because all pieces of $bw_i$ satisfy the quality condition in this state, the optimal allocation band search unit 12 proceeds to Step S470.

In Step S470 (third time), whether the band condition is satisfied for all the target sessions is determined to be as follows.

$bw_1+bw_2+bw_3=750+250+500=1500 \leq bw_{total}=1500$

In this case, because the band condition is satisfied, the optimal allocation band search unit 12 updates each of targetQoE and bw' as follows and returns to Step S410.

$targetQoE=targetQoE+\beta=3.0+1.0=4.0$ $bw'=bw=(750,250,500)^T$

In Step S410 and the subsequent steps (fourth time), when $bw_1=750$ holds, $QoE_i=3.0<targetQoE=4.0$ holds, and thus $bw_1$ is updated as follows.

$bw_1=bw_1+\alpha=750+250=1000$ $QoE_1=4.0 \geq targetQoE=4.0$ when $bw_1=1000$

When $bw_2=250$ holds, $QoE_2=3.5<targetQoE=4.0$ holds, and thus $bw_2$ is updated as follows.

$bw_2=bw_2+\alpha=250+250=500$

As a result, the allocation band $bw_2$ that satisfies the quality conditions is searched as follows.

$QoE_2=4.0 \geq targetQoE=4.0$ when $bw_2=500$

When $bw_3=500$ holds, $QoE_3=3.0<targetQoE=4.0$ holds, and thus $bw_3$ is updated as follows.

$bw_3=bw_3+\alpha=500+250=750$

When $bw_3=750$ holds, $QoE_3=3.5<targetQoE=4.0$ holds, and thus $bw_3$ is updated as follows.

$bw_3=bw_3+\alpha=750+250=1000$

As a result, the allocation band $bw_2$ that satisfies the quality conditions is searched as follows.

$QoE_3=4.0 \geq targetQoE=4.0$ when $bw_3=1000$

Because all pieces of $bw_i$ satisfy the quality condition in this state, the optimal allocation band search unit 12 proceeds to Step S470.

In Step S470 (fourth time), whether the band condition is satisfied for all the target sessions is determined to be as follows.

$bw_1+bw_2+bw_3=1000+500+1000=2500>bw_{total}=1500$

In this case, because the band condition is not satisfied, $bw'=(750, 250, 500)^T$ at the current time point is output, and the search is ended.

As described above, according to the first embodiment, at a plurality of timings, the allocation band for each session is searched based on the QoE prediction value for each of a plurality of sessions corresponding to a plurality of types of applications.

Thus, it is possible to reduce the number of sessions having low QoE when a plurality of types of applications are set as control targets in a network environment that changes with time. As a result, it is possible to further reduce the number of sessions with low QoE while efficiently using existing network facilities. Further, future capital investment and user cancellation risk can be reduced.

Next, a second embodiment will be described. The second embodiment will be described with respect to points different from the first embodiment. Points not particularly described in the second embodiment may be the same as those in the first embodiment.

In the second embodiment, a processing procedure of Step S20 in FIG. 4 is different from that of the first embodiment. In the first embodiment, the allocation band of the moving image session is determined without considering the buffer length prediction value. When the buffer length prediction value is not considered, the risk of the occurrence of the playback stop increases, and the probability of causing a reduction in the final QoE is increased. Thus, in Step S20 of the second embodiment, in addition to the quality condition of the first embodiment, a condition for which the buffer length prediction value of the moving image session is to be satisfied is set. In order to search for the optimal allocation band under such quality conditions, in addition to a relation between the allocation band and the QoE prediction value, a relation between the allocation band and the buffer length prediction value is used. The latter relation can be predicted, for example, by using the technology disclosed in "Daisuke Ikegami, Hirotada Honda, Hiroshi Yamamoto, Hideki Nojiri, Akira Takahashi, "Playing state estimation method for progressive download services", IEICE Technical Report, vol. 111, no. 278, CQ2011-59, pp. 91-96, November 2011".

Figure 7:
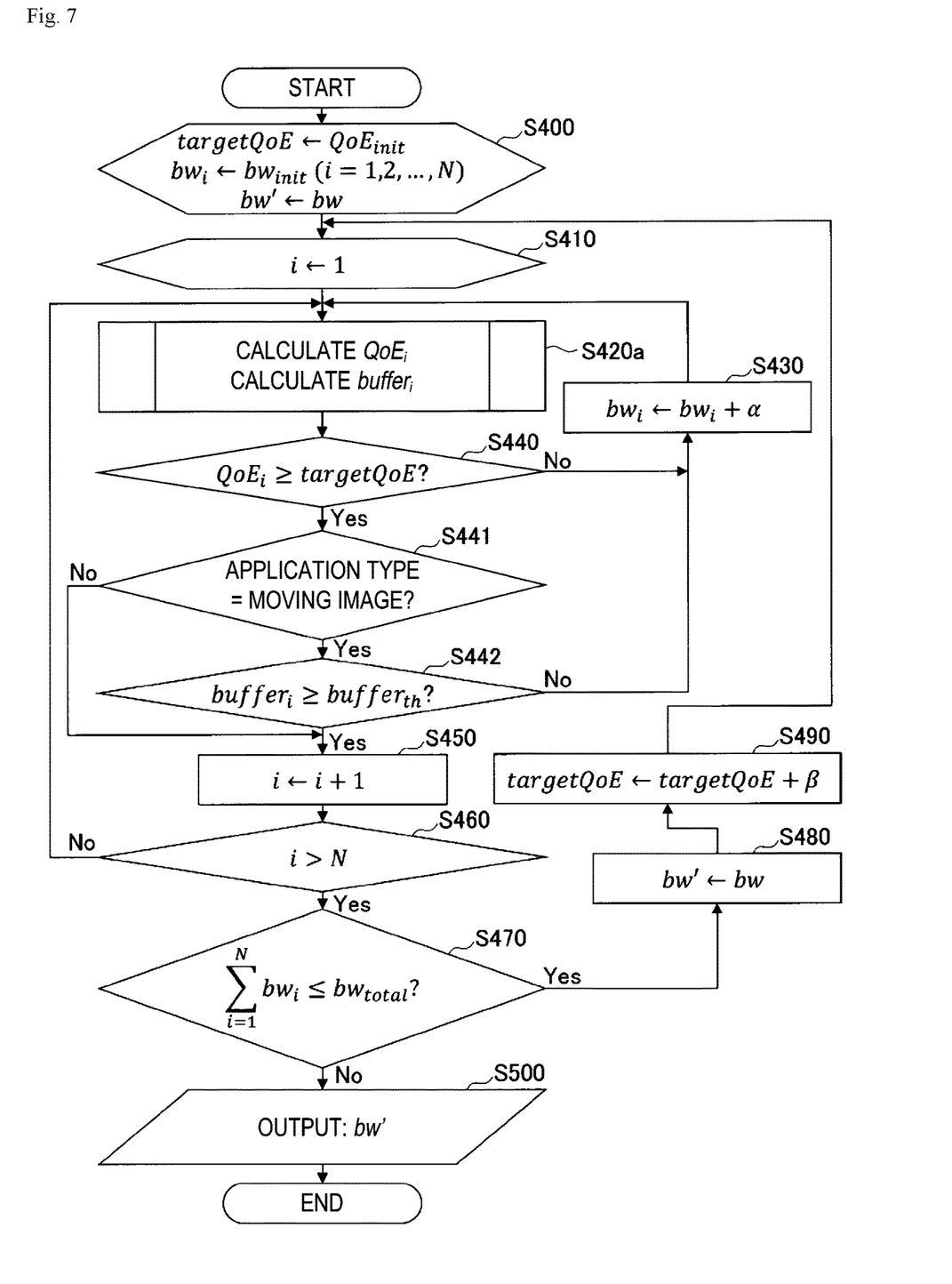
FIG. 7 is a flowchart for explaining an example of a processing procedure of search processing of an optimal allocation band according to a second embodiment.

FIG. 7 is a flowchart for explaining an example of a processing procedure of search processing of the optimal allocation band according to the second embodiment. In FIG. 7, the same steps as those in FIG. 6 are denoted by the same step numbers, and description thereof will be omitted as appropriate.

In FIG. 7, Step S420 is replaced with S420a. Steps S441 and S442 are added between Steps S440 and S450.

In Step S420a, the optimal allocation band search unit 12 calculates the buffer length prediction value buffer$_i$ of the session i, in addition to the QoE prediction value.

Steps S441 and S442 are steps for achieving addition, to the quality condition, of a condition that the buffer length prediction value buffer$_i$ of the moving image session i is equal to or greater than the buffer length threshold value buffer$_{th}$, in addition to that QoE$_i$ is equal to or greater than targetQoE.

That is, in Step S441, the optimal allocation band search unit 12 determines whether the application type of the session i is "moving image". When the application type of the session i is "moving image" (Yes in S441), the optimal allocation band search unit 12 determines whether the buffer length prediction value buffer$_i$ of the session i is equal to or greater than the buffer length threshold value buffer$_{th}$ (S442). When the buffer length prediction value buffer$_i$ is smaller than the buffer length threshold value buffer$_{th}$ (No in S442), the optimal allocation band search unit 12 proceeds to Step S430. When the buffer length prediction value buffer$_i$ is equal to or greater than the buffer length threshold value buffer$_{th}$ (Yes in S442), the optimal allocation band search unit 12 proceeds to Step S450.

Next, a third embodiment will be described. The third embodiment will be described with respect to points different from the first embodiment. Points not particularly mentioned in the third embodiment may be the same as those in the first embodiment.

In the third embodiment, a processing procedure of Step S20 in FIG. 4 is different from that of the first embodiment. In Step S20 of the third embodiment, the allocation band is searched to increase the number of sessions in which the QoE prediction value is equal to or greater than targetQoE being a predetermined threshold value.

Figure 8:
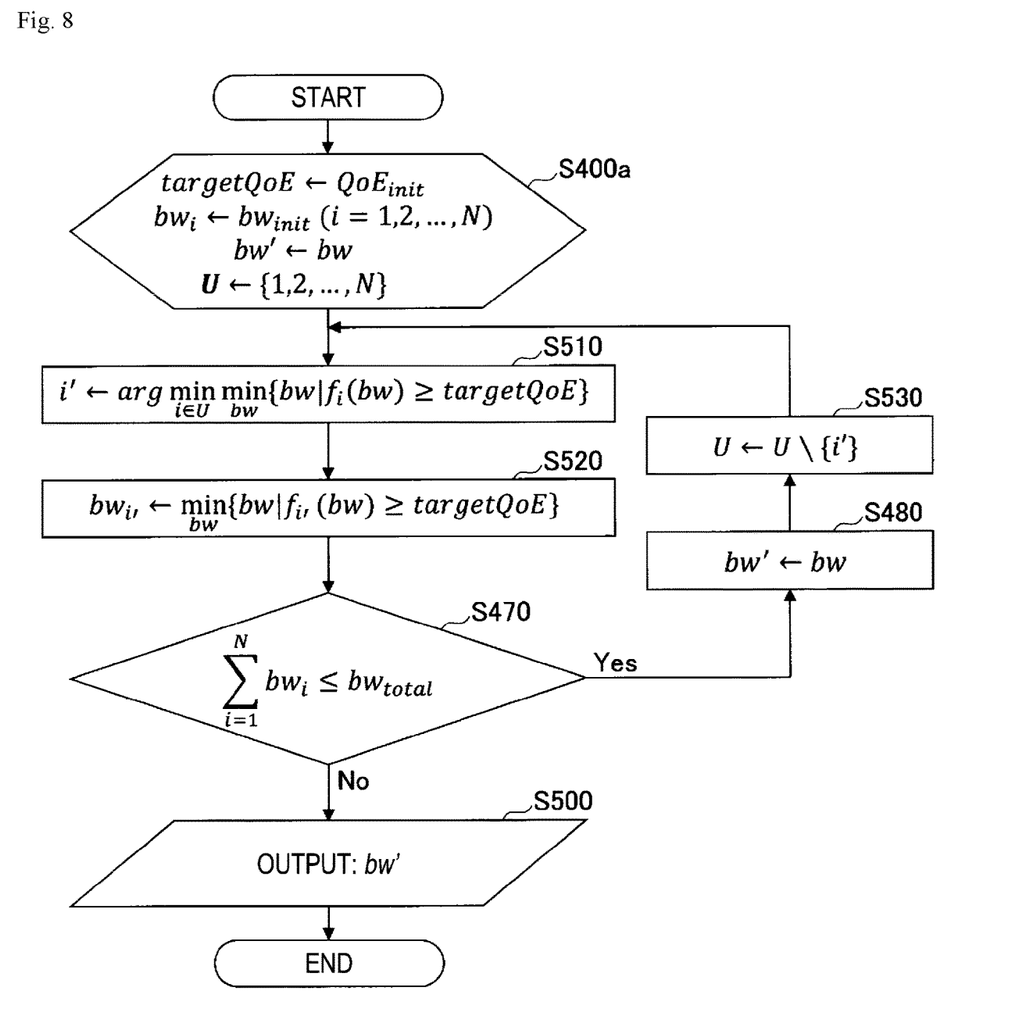
FIG. 8 is a flowchart for explaining an example of a processing procedure of search processing of an optimal allocation band according to a third embodiment.

FIG. 8 is a flowchart for explaining an example of a processing procedure of search processing of the optimal allocation band according to the third embodiment. In FIG. 8, the same steps as those in FIG. 6 are denoted by the same step numbers, and description thereof will be omitted as appropriate.

In FIG. 8, Step S400 is replaced with S400a. Steps S510 and S520 are performed instead of Steps S410 to S460. Further, Step S530 is performed instead of Step S490.

In Step S400a, the optimal allocation band search unit 12 further initializes a variable U (U={1, 2, . . . , N}). U={1, 2, . . . , N} is a variable indicating the set of session numbers.

In Step S510, the optimal allocation band search unit 12 calculates (specifies), among sessions related to the set U, a session i' in which the allocation band used for the QoE prediction value QoE$_i$ being equal to or greater than targetQoE. In Step S510, f$_i$(bw) represents a function that outputs the QoE prediction value QoE$_i$ by using the allocation band bw as an input.

In the subsequent Step S520, the optimal allocation band search unit 12 sets bw$_{i'}$ as the minimum allocation band in which QoE$_{i'}$ is equal to or greater than targetQoE.

In Step S530, the optimal allocation band search unit 12 substitutes a difference set obtained by removing i' from the set U into the set U.

The optimal allocation band search unit 12 repeats the above processing until the band conditions are not satisfied (S470). The third embodiment may be performed in combination with the conditions related to the buffer length of the moving image session described in the second embodiment. In this case, the portion of the condition in Steps S510 and S520 may be set to "f$_i$(bw)≥targetQoE && buffer$_i$≥buffer$_{th}$". However, the condition of "buffer$_i$≥buffer$_{th}$" is applied only to the session having an application type that is a moving image.

Next, a fourth embodiment will be described. The fourth embodiment will be described with respect to points different from the first embodiment. Points not particularly described in the fourth embodiment may be the same as those in the first embodiment.

In the fourth embodiment, a processing procedure of Step S20 in FIG. 4 is different from that of the first embodiment. In Step S20 of the fourth embodiment, the allocation band is searched to increase the average of the QoE prediction value.

Figure 9:
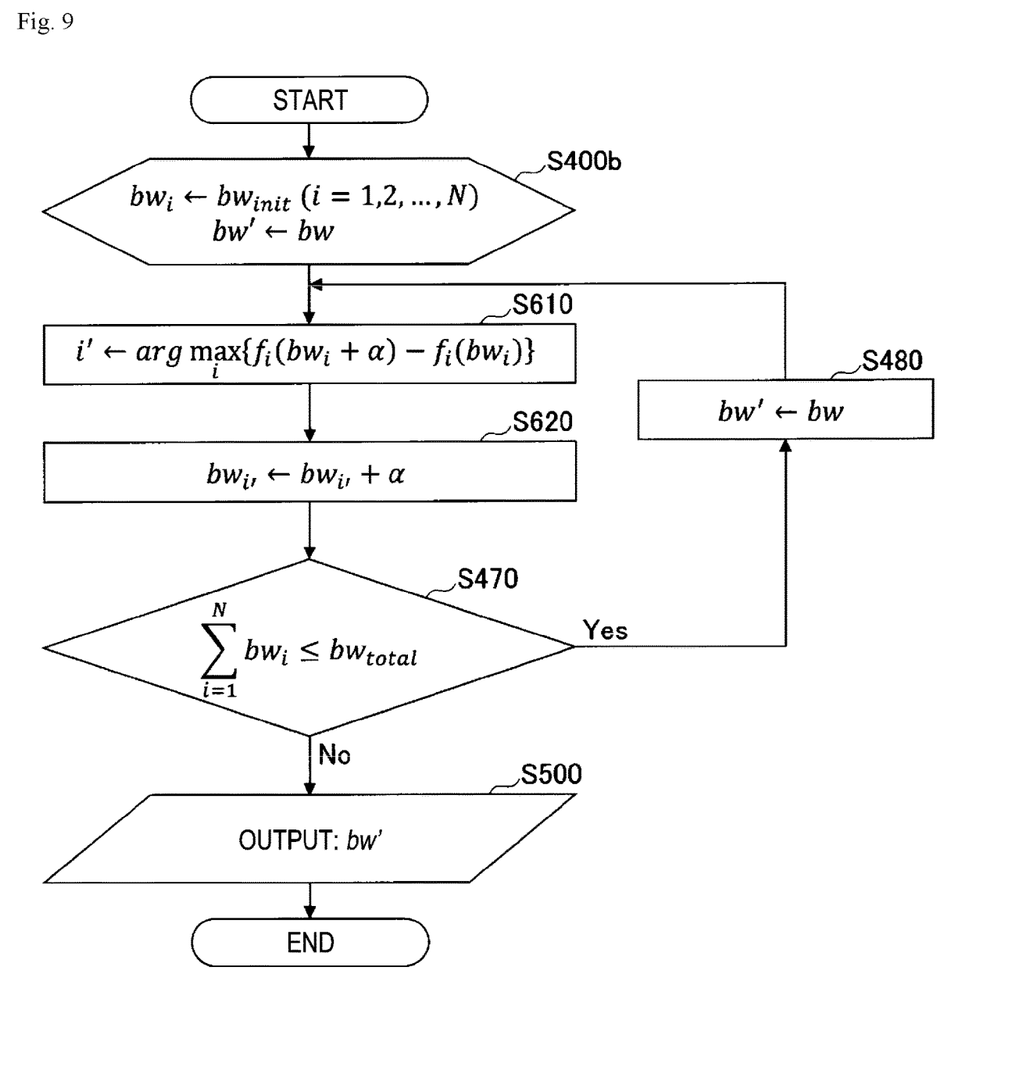
FIG. 9 is a flowchart for explaining an example of a processing procedure of search processing of an optimal allocation band according to a fourth embodiment.

FIG. 9 is a flowchart for explaining an example of a processing procedure of search processing of the optimal allocation band according to the fourth embodiment. In FIG. 9, the same steps as those in FIG. 6 are denoted by the same step numbers, and description thereof will be omitted as appropriate.

In FIG. 9, Step S400 is replaced with S400b. Steps S610 and S620 are performed instead of Steps S410 to S460, and Step S490 is not performed.

In Step S410b, targetQoE is not initialized. This is because targetQoE is not used in the processing procedure of FIG. 9.

In Step S610, the optimal allocation band search unit 12 calculates (specifies) a session i' in which the increase amount of the QoE prediction value when the allocation band is increased by α is maximized. In Step S610, f$_i$(bw) represents a function that outputs the QoE prediction value QoE$_i$ by using the allocation band bw as an input.

In the subsequent Step S620, the optimal allocation band search unit 12 increases bw$_{i'}$ by α.

The optimal allocation band search unit 12 repeats the above processing until the band conditions are not satisfied.

The fourth embodiment may be performed in combination with the conditions related to the buffer length of the moving image session described in the second embodiment. In this case, in Step S610, for a session having an application type that is a moving image, only a session satisfying "$buffer_i \geq buffer_{th}$," is set as a candidate for the session i'.

Next, a fifth embodiment will be described. The fifth embodiment will be described with respect to points different from the first embodiment. Points not particularly described in the fifth embodiment may be the same as those in the first embodiment.

In the fifth embodiment, a processing procedure of Step S20 in FIG. 4 is different from that of the first embodiment. In Step S20 of the fifth embodiment, the allocation band is searched to increase the minimum value of the QoE prediction value.

Figure 10:
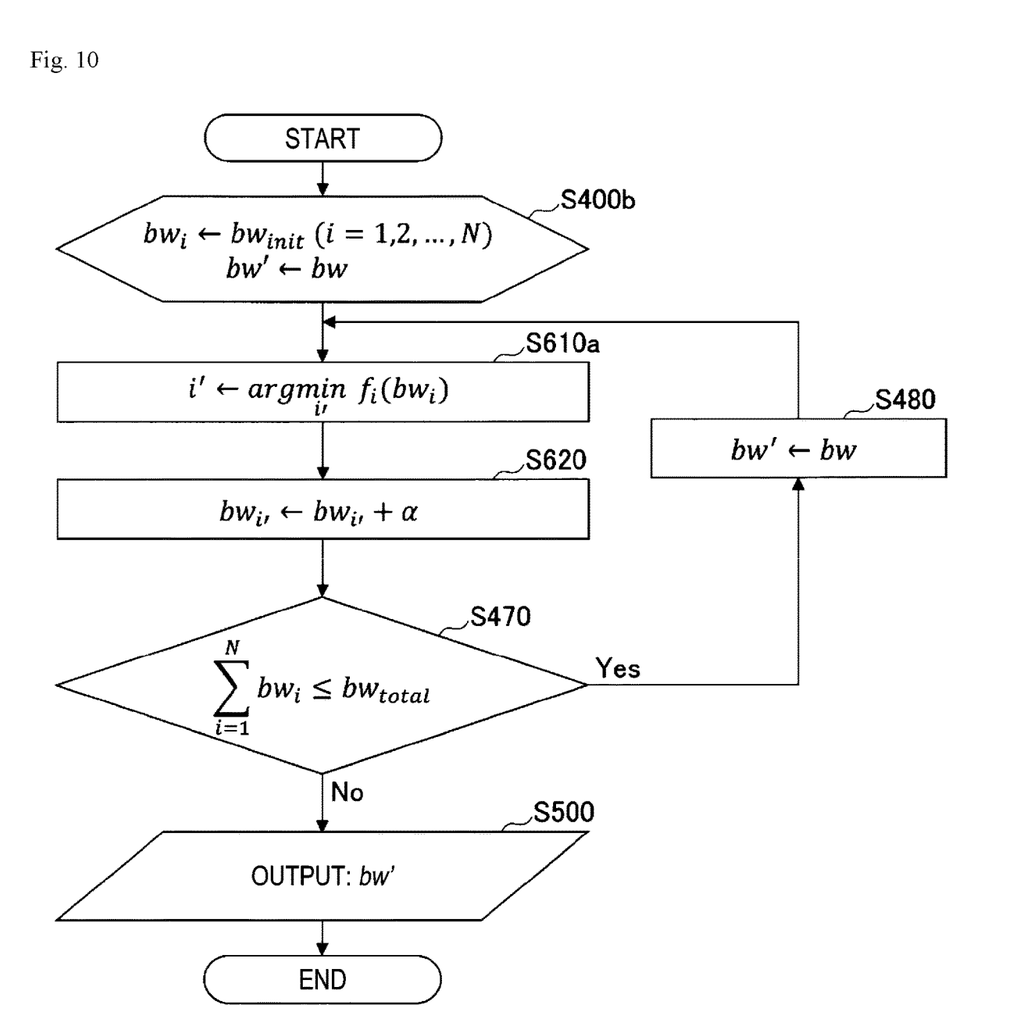
FIG. 10 is a flowchart for explaining an example of a processing procedure of search processing of an optimal allocation band according to a fifth embodiment.

FIG. 10 is a flowchart for explaining an example of a processing procedure of search processing of the optimal allocation band according to the fifth embodiment. In FIG. 10, the same steps as those in FIG. 9 are denoted by the same step numbers, and description thereof will be omitted as appropriate.

In FIG. 10, Step S610a is performed instead of Step S610. In Step S610a, the optimal allocation band search unit 12 calculates (specifies) a session i' in which the QoE prediction value in the current allocation band bw is minimized. In Step S610a, $f_i(bw_i)$ represents a function that outputs the QoE prediction value $QoE_i$ by using the allocation band $bw_i$ as an input.

The fifth embodiment may be performed in combination with the conditions related to the buffer length of the moving image session described in the second embodiment. In this case, when the application type of the session i' is a moving image in Step S610a, α is continuously added to $bw_i$, until the buffer prediction value of the session i' satisfies "$buffer_i \geq buffer_{th}$" in Step S620.

In each of the above embodiments, the application information acquisition unit 11 is an example of an acquisition unit. The optimal allocation band search unit 12 is an example of a search unit. The optimal allocation band control unit 13 is an example of a control unit.

Although the embodiments of the present disclosure have been described in detail above, the present disclosure is not limited to such specific embodiments, and various modifications and change can be made within the scope of the gist of the present disclosure described in the aspects.

This application claims priority based on international patent application No. PCT/JP2020/007227 filed on Feb. 21, 2020, and the entire contents of the international patent application of the same date are incorporated herein by reference.

REFERENCE SIGNS LIST

10 Control apparatus
11 Application information acquisition unit
12 Optimal allocation band search unit
13 Optimal allocation band control unit
14 Application information storage unit
100 Drive device
101 Recording medium
102 Auxiliary storage device
103 Memory device
104 CPU
105 Interface device
B Bus

The invention claimed is:

1. A control apparatus comprising a processor and a memory that stores instructions, wherein the processor is configured to execute the instructions that cause the control apparatus to:
   acquire application information related to at least one of a plurality of sessions at a plurality of timings for each of the plurality of sessions related to a plurality of types of applications that are communicating in a network;
   search for an allocation band of each of the plurality of sessions at the plurality of timings based on a quality of experience (QoE) prediction value of each of the plurality of sessions derived from the application information and a condition for a band of the network; and
   control allocation of a band for each of the plurality of sessions at the plurality of timings based on the allocation band,
   wherein the QoE prediction value indicates an estimated QoE value at a time point after a certain band is allocated to each of the plurality of sessions.

2. The control apparatus according to claim 1, wherein the instructions cause the control apparatus to search for the allocation band in such a manner that the QoE prediction value of the session whose QoE prediction value is minimum increases.

3. The control apparatus according to claim 1, wherein the instructions cause the control apparatus to search for the allocation band in such a manner that the number of sessions where the QoE prediction value of each of the plurality of sessions is equal to or greater than a threshold value increases.

4. The control apparatus according to claim 1, wherein the instructions cause the control apparatus to search for the allocation band in such a manner that an average of a plurality of the QoE prediction values of the plurality of corresponding sessions increases.

5. The control apparatus according to claim 1, wherein the instructions cause the control apparatus to search for the allocation band in such a manner that a buffer length prediction value at a terminal related to a session of a moving image becomes equal to or greater than a threshold value.

6. The control apparatus according to claim 1, wherein the instructions cause the control apparatus to search for the allocation band in such a manner that a minimum value of the QoE prediction value increases.

7. A control method comprising:
   acquiring, by a computer, application information related to at least one of a plurality of sessions at a plurality of timings for each of the plurality of sessions related to a plurality of types of applications that are communicating in a network;
   searching, by the computer, for an allocation band of each of the plurality of sessions at the plurality of timings based on a quality of experience (QoE) prediction value of each of the plurality of sessions derived from the application information and a condition for a band of the network; and
   controlling, by the computer, allocation of a band for each of the plurality of sessions at the plurality of timings based on the allocation band searched in the searching,
   wherein the QoE prediction value indicates an estimated QoE value at a time point after a certain band is allocated to each of the plurality of sessions.

8. A non-transitory computer-readable medium containing a program that causes a computer to perform operations comprising:

acquiring application information related to at least one of a plurality of sessions at a plurality of timings for each of the plurality of sessions related to a plurality of types of applications that are communicating in a network;

searching for an allocation band of each of the plurality of sessions at the plurality of timings based on a quality of experience (QoE) prediction value of each of the plurality of sessions derived from the application information and a condition for a band of the network; and controlling allocation of a band for each of the plurality of sessions at the plurality of timings based on the allocation band searched in the searching, wherein the QoE prediction value indicates an estimated QoE value at a time point after a certain band is allocated to each of the plurality of sessions.

* * * * *

UNITED STATES PATENT AND TRADEMARK OFFICE
CERTIFICATE OF CORRECTION

| | | |
|---|---|---|
| PATENT NO. | : 11,805,074 B2 | Page 1 of 1 |
| APPLICATION NO. | : 17/800078 | |
| DATED | : October 31, 2023 | |
| INVENTOR(S) | : Hideaki Kinsho et al. | |

It is certified that error appears in the above-identified patent and that said Letters Patent is hereby corrected as shown below:

On the Title Page

Column 1 at item (86), please insert missing PCT application -- PCT No.: PCT/JP2020/007227 --;

Also at item (86), under § 371 (c)(1), (2) Date: please insert -- February 21, 2020 --.

Signed and Sealed this
Tenth Day of December, 2024

Katherine Kelly Vidal
*Director of the United States Patent and Trademark Office*